UNITED STATES PATENT OFFICE.

SHOJI MATSUO, OF SAGA PREFECTURE, JAPAN.

PROCESS OF MANUFACTURING SILICATED CEMENT.

1,367,984.     Specification of Letters Patent.     Patented Feb. 8, 1921.

No Drawing.     Application filed August 9, 1917. Serial No. 185,294.

*To all whom it may concern:*

Be it known that I, SHOJI MATSUO, a subject of the Emperor of Japan, residing at Saga Prefecture, Japan, have invented certain new and useful Improvements in Processes of Manufacturing Silicated Cement, of which the following is a specification.

This invention relates to cement, and more particularly to a process of manufacturing silicated cement.

The principal object of this invention is to provide a cement which is easy and cheap to manufacture and will possess properties which render it superior to the cement now in use for resisting the chemical action of brine, water, the destructive chemicals ever present in water, and other deteriorating elements.

In manufacturing this cement, I first mix 70 to 110 parts of silica sand with 85 parts of hydrochloric acid per 100 parts of silica sand and 100 parts of Portland cement clinkers. It is obvious that the sand is not affected adversely by the action of the hydrochloric acid thereon; but the impurities attached to said sand are removed.

After thoroughly washing the sand, as above described, I take the wet sand and mix it with hot Portland cement clinkers. After this mixing, the mixture is allowed to cool, the hot clinkers, in cooling, drying the silica sand.

In the process of cooling, the impurities present in the mixture, *i. e.* small quantities of free lime, will be chemically changed to a harmless substance.

After the mixture has thoroughly cooled, it is then finely pulverized in any well known manner, and it is then ready for use, in the usual method.

It is believed that the chemical properties of this composition will be readily understood by those skilled in the art, and no further description, it is believed, is necessary.

What I claim as new and desire to secure by Letters Patent is:

1. The process of manufacturing cement, consisting of washing sand in hydrochloric acid, adding hot Portland cement clinkers to said sand while still in a wet condition, cooling the mixture and then pulverizing it.

2. The process of manufacturing cement, consisting of washing 100 parts of silica sand with 85 parts of hydrochloric acid, mixing the wet sand with hot Portland cement clinkers, cooling the mixture, and finally pulverizing the mixture thus formed.

In testimony whereof I affix my signature here below.

SHOJI MATSUO.